(12) United States Patent
Nyberg

(10) Patent No.: US 8,219,275 B2
(45) Date of Patent: Jul. 10, 2012

(54) FAULT DIAGNOSIS

(75) Inventor: Mattias Nyberg, Tullinge (SE)

(73) Assignee: Scania CV AB, Soedertaelje (SE)

( * ) Notice: Subject to any disclaimer, the term of this patent is extended or adjusted under 35 U.S.C. 154(b) by 932 days.

(21) Appl. No.: 11/765,110

(22) Filed: Jun. 19, 2007

(65) Prior Publication Data

US 2007/0299574 A1    Dec. 27, 2007

(30) Foreign Application Priority Data

Jun. 22, 2006   (SE) ...................................... 0601376

(51) Int. Cl.
*G01M 17/00*   (2006.01)

(52) U.S. Cl. ........................ 701/29.1; 701/33.4; 702/183

(58) Field of Classification Search .......... 701/1, 29–31, 701/33–35

See application file for complete search history.

(56) References Cited

U.S. PATENT DOCUMENTS

| | | | | |
|---|---|---|---|---|
| 5,544,308 | A | | 8/1996 | Giordano et al. |
| 5,631,831 | A | * | 5/1997 | Bird et al. ........................ 701/29 |
| 5,922,079 | A | | 7/1999 | Booth et al. |
| 6,597,973 | B1 | * | 7/2003 | Barich et al. ..................... 701/29 |
| 6,615,120 | B1 | * | 9/2003 | Rother ............................. 701/33 |
| 6,622,264 | B1 | | 9/2003 | Bliley et al. |
| 6,983,200 | B2 | | 1/2006 | Bodin et al. |
| 7,012,512 | B2 | | 3/2006 | St. Denis |
| 7,643,916 | B2 | * | 1/2010 | Underdal et al. ................ 701/29 |
| 7,702,435 | B2 | * | 4/2010 | Pereira et al. ................... 701/29 |
| 7,751,955 | B2 | * | 7/2010 | Chinnadurai et al. .......... 701/33 |
| 7,765,040 | B2 | * | 7/2010 | Underdal et al. ................ 701/29 |
| 7,809,986 | B2 | * | 10/2010 | Nyberg et al. ................... 714/26 |
| 7,865,278 | B2 | * | 1/2011 | Underdal et al. ................ 701/29 |
| 7,925,397 | B2 | * | 4/2011 | Underdal et al. ................ 701/29 |
| 2002/0161493 | A1 | * | 10/2002 | Bird et al. ........................ 701/29 |
| 2003/0004741 | A1 | * | 1/2003 | Johnson et al. .................. 705/1 |
| 2006/0178791 | A1 | * | 8/2006 | Fountain et al. ................ 701/31 |

(Continued)

FOREIGN PATENT DOCUMENTS

EP       1356996 A2    10/2003

(Continued)

OTHER PUBLICATIONS

Dekleer, J. and Williams, B.C.; Diagnosing Multiple Faults; Artificial Intelligence; 1987; pp. 97-130; Issue 1, vol. 32; Elsevier Science Publishers B.V., North-Holland.

Reiter, R.; A Theory of Diagnosis from First Principles; Artificial Intelligence, Apr. 1987; pp. 57-95; Issue 1, vol. 32; Elsevier Science Publishers B.V., North-Holland.

(Continued)

*Primary Examiner* — Helal A Algahaim
(74) *Attorney, Agent, or Firm* — Moore & Van Allen, PLLC; W. Kevin Ransom

(57) ABSTRACT

Status of an entity having a plurality of components is determined from a listing of enhanced diagnostic expressions. For each combination of diagnostic expressions, a current joint diagnostic expression is generated representing a conjunction of first and second diagnostic expressions from respective first and second received listings. This expression is compared with each diagnostic expression in a generated listing of enhanced diagnostic expressions, and is discarded if: there exists a previous expression in the listing that implies the previous expression or there exists either a first or second diagnostic expression in the respective first or second listing that has not yet been included in a joint diagnostic expression and the current joint diagnostic expression implies either the first or second diagnostic expression. Any other joint diagnostic expressions are stored in the listing of enhanced diagnostic expressions. A status report is generated based on the listing of enhanced diagnostic expressions.

12 Claims, 2 Drawing Sheets

U.S. PATENT DOCUMENTS

2007/0293998 A1* 12/2007 Underdal et al. ............... 701/29
2007/0294000 A1* 12/2007 Underdal et al. ............... 701/29
2007/0294001 A1* 12/2007 Underdal et al. ............... 701/29

FOREIGN PATENT DOCUMENTS

| EP | 1136912 B1 | 11/2004 |
| JP | 2004151021 A | 5/2004 |
| WO | WO02/054654 A2 | 7/2002 |

OTHER PUBLICATIONS

Nyberg, Mattias and Krysander, Mattias; Combining AI, FDI, and Statistical Hypothesis-Testing in a Framework for Diagnosis; Proceedings of IFAC Safe Process '03; 2003; Washington, USA.

European Search Report for Design Application 07108585.6, dated Feb. 10, 2010.

* cited by examiner

FAULT DIAGNOSIS

THE BACKGROUND OF THE INVENTION AND PRIOR ART

The present invention relates generally to diagnosing complex systems and devices including a large number of parts and components.

As today's technical systems generally become increasingly complex, efficient monitoring and detection of malfunctioning components is an area that gains progressive importance. Fault diagnosis algorithms may be applied to determine why an entity does not behave as intended. Typically, "diagnosing" the entity means selecting a subset of a predetermined set of causes responsible for the entity's incorrect behavior. A diagnosis must both explain the incorrect behavior and optimize some objective function, such as probability of correctness or cost of incorrect diagnosis. The need to diagnose is a common reason to measure or to test the entity. It is assumed that the entity consists of a finite number of diagnosed components. Moreover, it is normally presumed that failures of the entity are caused only by faults in at least one of these components.

In Reiter, R., "A theory of diagnosis from first principles", *Artificial Intelligence,* 32(1):57.95, April, 1987 and deKleer, J. and Williams, B. C., "Diagnosing multiple faults" *Artificial Intelligence,* Issue 1, Volume 32: pp. 97.130, 1987, algorithms for finding all so-called minimal diagnoses are presented. Later, various improvements of these algorithms have also been described. The above-mentioned original algorithm and its associated framework as presented by deKleer and Williams presumes that the system to be diagnosed includes of a number of components being represented by a set C. Here, a conflict is represented as a set $C \subseteq C$. A conflict C is understood to mean that not all components in C can be in the fault-free mode. Moreover, a conflict $C_1$ is said to be minimal if there is no other conflict $C_2$ such that $C_2 \subset C_1$.

A diagnosis $\delta$ is also represented as a set $\delta \subseteq C$. The meaning of a diagnosis $\delta$ is that the components contained in $\delta$ are faulty and the components not contained in $\delta$ are fault-free. A diagnosis $\delta_1$ is said to be minimal if there is no other diagnosis $\delta_2$ such that $\delta_2 \subset \delta_1$.

One fundamental relation between conflicts and diagnoses is that if $\mathbb{C}$ is the set of all minimal conflicts, then $\delta$ is a diagnosis if and only if for all conflicts $C \in \mathbb{C}$ it holds that $\delta \cap C \neq \emptyset$.

Given a set of diagnoses $\Delta$ and a conflict C the minimal hitting set algorithm according to deKleer and Williams finds an updated set of minimal diagnoses. Specifically, the algorithm as described by deKleer and Williams, can be written as follows.

Input: a set of minimal diagnoses $\Delta$, and a conflict set C.
Output: an updated set of minimal diagnoses $\Theta$.

```
Δ_old = Δ
for all δ_i ∈ Δ do
    if δ_i ∩ C ≠ ∅; then
        Remove δ_i from Δ_old
        for all c ∈ C do
            δ_new := δ_i ∪ {c}
            for all δ_k ∈ Δ, δ_k ≠ δ_i do
                if δ_k ⊆ δ_new; then
                    go to LABEL1
                end if
            next
            Δ_add := Δ_add ∪ {δ_new}
            LABEL1
        next
    end if
next
Θ := Δ_old ∪ Δ_add
```

The algorithm has the properties that if $\Delta$ is the set of all minimal diagnoses, the algorithm output $\Theta$ will contain all minimal diagnoses with respect to also the new conflict C. Further, it holds that $\Theta$ will contain only minimal diagnoses.

These are certainly useful properties when monitoring and testing an entity. However, when determining the status of a complex entity, it is a severe limitation that each component may only have two possible behavioral modes, i.e. either be fault-free or be faulty. Instead, more specific fault statuses are desirable for improved diagnosis quality.

SUMMARY OF THE INVENTION

The object of the present invention is therefore to provide a solution, which solves the problem above, and thus offers distinction between more than two behavioral modes.

According to one aspect of the invention, the object is achieved by the initially described diagnosis engine, wherein the engine includes a first storage area and a second storage area. The first storage area is adapted to store first and second listings of diagnostic expressions. These listings indicate either a fault-free mode, or exactly one of at least one fault mode for at least one of the entity's components. The second storage area is adapted to store a listing of enhanced diagnostic expressions, which indicate at least one of said modes for at least one of said components. Moreover, the processing unit of the diagnosis engine is adapted to receive the first and second listings, and to store these listings in the first storage area. The processing unit is further adapted to create an empty listing of enhanced diagnostic expressions by initially clearing any contents of the second storage area. Thereafter, for each combination of diagnostic expressions in the first and second listings, the processing unit is adapted to generate a current joint diagnostic expression representing a conjunction of a first diagnostic expression from the first listing and a second diagnostic expression from the second listing. The processing unit is then adapted to compare the current joint diagnostic expression with each diagnostic expression in the listing of enhanced diagnostic expressions stored in the second storage area. The current joint diagnostic expression is discarded if there exists a previous expression in the listing of enhanced diagnostic expressions, and the current joint diagnostic expression implies the previous expression. The current joint diagnostic expression is likewise discarded if there exists a first diagnostic expression in the first listing, (i) the first diagnostic expression has not yet been included in a joint diagnostic expression, and (ii) the current joint diagnostic expression implies the first diagnostic expression. Analogously, the current joint diagnostic expression is discarded if there exists a second diagnostic expression in the second listing, (i) the second diagnostic expression has not yet been included in a joint diagnostic expression, and (ii) the current joint diagnostic expression implies the second diagnostic expression. Otherwise, the processing unit is adapted to store the joint diagnostic expression as an addition to the listing of enhanced diagnostic expressions in the second storage area. After thus having investigated each combination of diagnostic expressions in the first and second listings, the processing unit is adapted to generate a status report based on the listing of enhanced diagnostic expressions.

This diagnosis engine is advantageous because it has a comparatively open interface with respect to its input parameters. Namely, that the relationship between the components of the entity and their statuses reflected by the first and second listings of diagnostic expressions is relatively relaxed. This means that said listings may represent test results, previously generated enhanced diagnostic expressions (or listings thereof), as well as diagnostic conclusions made by one or more other diagnosis engines. Hence, it is irrelevant whether or not the first and second listings represent "raw" test data, or if they constitute some form of refined data describing the components' conditions. Naturally, this provides an outstanding flexibility of the design. Furthermore, whenever new source data becomes available via at least one of the listings, the status report can be updated correspondingly in a straightforward manner.

According to one embodiment of this aspect of the invention, the processing unit is adapted to receive at least one of the first and second listings from at least one sensor unit being associated with at least one of said components. The at least one listing is presumed to reflect test results in respect of at least one of said components to which the at least one sensor unit is associated. I.e. at least one of the listings contains test result data. Consequently, the diagnosis engine may receive test result data without any pre-processing thereof.

According to another embodiment of this aspect of the invention, the processing unit is adapted to receive at least one of the first and second listings from at least one auxiliary diagnosis engine being associated with at least a sub-group of the entity's components. This at least one listing is presumed to include status reports in respect of the sub-group of said components to which the at least one auxiliary diagnosis engine is associated. Consequently, the diagnosis engine can be aided/supported by one or more other diagnosis engines, which produce status reports, either as an alternative or a complement to the above-mentioned test reports. Naturally, this further enhances the flexibility of the design.

According to another aspect of the invention, the object is achieved by the motor vehicle described initially, wherein the diagnosis system includes the above-proposed diagnosis engine.

According to another aspect of the invention, the object is achieved by the method described initially, wherein a first and a second listing of diagnostic expressions are received and stored in a first storage area. The method also involves creating an empty listing of enhanced diagnostic expressions by clearing any contents of a second storage area. Thereafter, for each combination of diagnostic expressions in the first and second listings, a current joint diagnostic expression is generated as a conjunction of a first diagnostic expression from the first listing and a second diagnostic expression from the second listing. The current joint diagnostic expression is compared with each diagnostic expression in the listing of enhanced diagnostic expressions stored in the second storage area, and the current joint diagnostic expression is discarded: if there exists a previous expression in the listing of enhanced diagnostic expressions, and the current joint diagnostic expression implies the previous expression; if there exists a first diagnostic expression in the first listing, the first diagnostic expression having not yet been included in a joint diagnostic expression and the current joint diagnostic expression implies the first diagnostic expression; or if there exists a second diagnostic expression in the second listing, the second diagnostic expression having not yet been included in a joint diagnostic expression and the current joint diagnostic expression implies the second diagnostic expression. For all other joint diagnostic expressions, the method involves storing the joint diagnostic expression as an addition to the listing of enhanced diagnostic expressions in the second storage area. Finally, a status report is generated based on the listing of enhanced diagnostic expressions in the second storage area.

The advantages of this method, as well as the preferred embodiments thereof, are apparent from the discussion hereinabove with reference to the proposed vehicle arrangement.

According to a further aspect of the invention the object is achieved by a computer program product directly loadable into the internal memory of a computer, comprising software for controlling the above proposed method when said program is run on a computer.

According to another aspect of the invention the object is achieved by a computer readable medium, having a program recorded thereon, where the program is to make a computer control the above proposed method.

BRIEF DESCRIPTION OF THE DRAWINGS

The present invention is now to be explained more closely by means of embodiments, which are disclosed as examples, and with reference to the attached drawings.

DESCRIPTION OF EMBODIMENTS OF THE INVENTION

Figure 1:
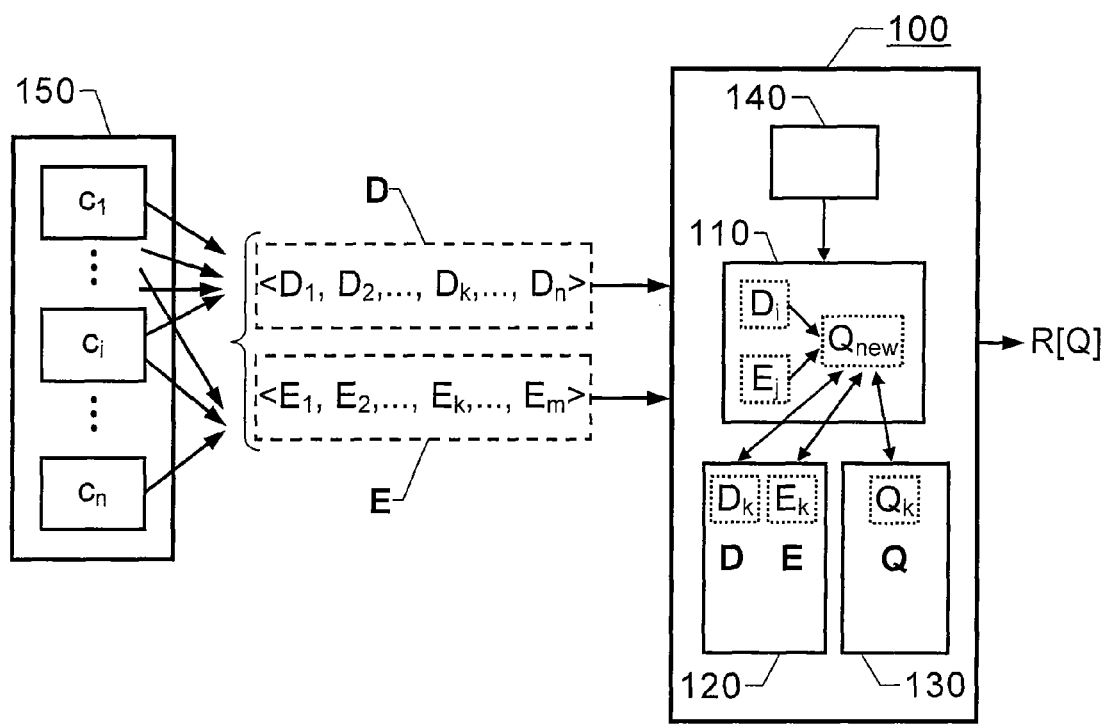
FIG. 1 shows a block diagram over a diagnosis engine according to one embodiment of the invention, FIG. 2 schematically depicts a motor vehicle equipped with the proposed diagnosis engine.

When describing the invention, we use the terms "statements" and "diagnostic expressions."

A "statement" specifies one or more modes for a particular component. One example of a statement is:

"the intake pressure sensor is fault-free or has a bias".

Other examples of statement are:

"the engine speed sensor has an unknown error"

and

"the exhaust gas regulator valve has jammed in a closed position or has an unknown error"

respectively.

The term "diagnostic expression" is defined to designate a conjunction of statements relating to a diagnosed entity, which reflect faulty or fault-free statuses of one or more components. One example of a diagnostic expression is:

"the intake pressure sensor is fault-free or has a bias, and the exhaust gas regulator valve has jammed in a closed position or has an unknown error."

Of course, given these definitions, a diagnostic expression is generally more informative (or contains information of a higher quality) than an individual statement.

Moreover, a first diagnostic expression may logically "imply" a second diagnostic expression. One example of such an implication is:

"the intake pressure sensor is fault-free"

implies that

"the intake pressure sensor is fault-free or has a bias."

Another example is:

"the intake pressure sensor is fault-free or has a bias, and the exhaust gas regulator valve has jammed in a closed position"

implies that

"the intake pressure sensor is fault-free or has a bias."

Formally, each component is assumed to be in exactly one out of several behavioral modes. A behavioral mode can be for example no-fault, abbreviated NF, gain-fault G, bias B, open circuit OC, short circuit SC, unknown fault UF, or just faulty F. For our purposes, each component is abstracted to a variable specifying the mode of that component. Let C denote the set of such variables. For each component variable c let $R_c$ denote the domain of possible behavioral modes, i.e. $c \in R_c$.

Formally, each component is assumed to be in exactly one out of several behavioral modes. A behavioral mode can be for example no-fault, abbreviated NF, gain-fault G, bias B, open circuit OC, short circuit SC, unknown fault UF, or just faulty F. For our purposes, each component is abstracted to a variable specifying the mode of that component. Let now C denote the set of such variables. For each component variable c let $R_c$ denote the domain of possible behavioral modes, i.e. $c \in R_c$.

To reason about the behavioral modes of different components, we use the following formal language. The expression $c \in M$, where $c \in C$ and $M \subseteq R_c$ is a formula. For example, if p is a pressure sensor, the formula $p \in \{NF, G, UF\}$ means that the pressure sensor p is in mode NF, G or UF. If M is a singleton, e.g. $M=\{NF\}$, this may also be expressed $c=NF$. Further, the constant $\perp$ with value false, is a formula. If $\phi$ and $\gamma$ are formulas, then $\phi \wedge \gamma$, $\phi \vee \gamma$, and $\neg \phi$ are also formulas. In accordance with the theory of first order logic, we say that a formula $\phi$ is implied by another formula $\gamma$, and write $\gamma \models \phi$, if all assignments of the variables C that make $\gamma$ true also make $\phi$ true. This can be generalized to sets of formulas, i.e. $\{\gamma_1, \ldots, \gamma_n\} \models \{\phi_1, \ldots, \phi_m\}$ if and only if $\gamma_1 \wedge \ldots \wedge \gamma_n \models \phi_1 \wedge \ldots \wedge \phi_m$. If it holds that $\Gamma \models \Phi$ and $\Phi \models \Gamma$, where $\Phi$ and $\Gamma$ are formulas or sets of formulas, $\Phi$ and $\Gamma$ are said to be equivalent and we write $\Gamma \cong \Phi$.

For conjunctions $(c_{i1} \in M_{i1} \wedge c_{i2} \in M_{i2} \wedge \ldots c_{ini} \in M_{ini})$, we will often use the notation $D_i$. We will say that a formula is in maximal normal form (MNF) if it is written on the form $$(c_{11} \in M_{11} \wedge c_{12} \in M_{12} \wedge \ldots c_{1n1} \in M_{1n1}) \vee \ldots$$
$$\vee (c_{m1} \in M_{m1} \wedge \ldots \wedge c_{mnm} \in M_{mnm}) \text{ where } c_{ij} \neq c_{ik}$$
if $j \neq k$, and 1) no conjunction is implied by another conjunction, i.e. for each conjunction $D_i$, there is no conjunction $D_j$, $j \neq i$, for which it holds that $D_j \models D_i$, and
2) each $M_{ij}$ is a nonempty proper subset of $R_{cij}$, i.e.; $\emptyset \neq M_{ij} \subset R_c$.

These two requirements will later be referred to as the MNF requirements. Note that the purpose of using formulas in MNF is that the two MNF-requirements guarantee that a formula is relatively compact in the sense that it does not contain redundant conjunctions and that each conjunction does not contain redundant assignments.

For example consider the following two formulas containing pressure sensors $p_1$, $p_2$ and $p_3$, where all have the behavioral modes $R_{pi} = \{NF, G, B, UF\}$.

$$p_1 \in \{UF\} \wedge p_2 \in \{B, UF\} \vee p_3 \in \{UF\}$$

$$p_1 \in \{UF\} \wedge p_2 \in \{B, UF\} \vee p_1 \in \{G, UF\}$$

The first formula is in MNF, however not the second formula, since $p_1 \in \{UF\} \wedge p_2 \in \{B, UF\} \models p_1 \in \{G, UF\}$.

Using the logical language defined above, a conflict can be expressed as follows. For example, if it has been found that the pressure sensor $p_1$ cannot be in the mode NF at the same time as $p_2$ is in the mode B or NF, this gives the conflict $$H = p_1 \in \{NF\} \wedge p_2 \in \{B, NF\} \tag{1}$$

This definition of conflict can be compared with the previously mentioned conflict $C=\{a, b, c\}$. Using the logical language, we can write this conflict as $a \in \{NF\} \wedge b \in \{NF\} \wedge c \in \{NF\}$ Instead of conflicts, the invention will primarily be described with reference to negated conflicts. Therefore, as an alternative to H, we consider $\neg H$. In particular we will use negated conflicts written in MNF. For an example, the negated conflict $\neg H$, where H is defined in (1), can be written in MNF as:

$$p_1 \in \{G, B, UF\} \vee p_2 \in \{G, UF\}$$

In this context, the negated conflict is equivalent to the above-mentioned test result. Without loss of generality, we will from now on assume that all negated conflicts are written on the form:

$$c_1 \in M_1 \vee c_2 \in M_2 \vee \ldots \vee c_n \in M_n \tag{2}$$

where $c_j \neq c_k$ if $j \neq k$ and $\emptyset \neq M_i \subset R_{ci}$. This means that both MNF-requirements (1) and (2) are fulfilled respectively.

A system behavioral mode is defined as a conjunction containing a unique assignment of all components in C. For example if $C=\{p_1, p_2, p_3\}$, a system behavioral mode could be:

$$p_1 = UF \wedge p_2 = B \wedge p_3 = NF$$

We consider the term diagnosis to refer to a system behavioral mode consistent with all negated conflicts. More formally, if $\mathbb{P}$ is the set of all negated conflicts, a system behavioral mode d is a diagnosis if $\{d\} \cup \mathbb{P} \not\models \perp$ or equivalently $d \models \mathbb{P}$.

To relate this definition of diagnosis to the definition used by deKleer and Williams, assume that $C=\{a, b, c, d\}$ and consider the diagnosis $\delta=\{a, b\}$. With the logical language, we can write this diagnosis as $a=F \wedge b=F \wedge c=NF \wedge d=NF$.

The algorithm according to the present invention is capable of handling more than two behavioral modes per component. Also fault models can be handled. As inputs, the algorithm takes a formula D and a negated conflict P, which are both written in MNF. The purpose of the algorithm is then to derive a new formula Q in MNF such that $Q \cong D \wedge P$.

An expression $Q_{new}$ in MNF must be found such that $D_{new} \cong D_i \wedge P_j$. To illustrate this, consider an example where $D_i$ contains components $c_1$ and $c_2$, and $P_j$ contains the component $c_2$. Since D is in MNF and P is in the form (2), $D_i$ and $P_j$ will have the form $$D_i = c_1 \in M_1^D \wedge c_2 \in M_2^D \tag{5a}$$

$$P_j = c_2 \in M_2^P \tag{5b}$$

Then $Q_{new}$ will be formed as $$D_{new} = c_1 \in M_1^D \wedge c_2 \in M_2^D \cap M_2^P$$

which means that $D_{new} \cong D_i \wedge P_j$. If it holds that $M_2^P \neq \emptyset$, $D_{new}$ will be in MNF. Otherwise let $D_{new} = \perp$.

The check $D_{new} \models D_k$ will then immediately make the algorithm jump to LABEL1 meaning that $D_{new}$ will not be added to $D_{add}$.

The condition $D_{new} \models D_k$ must be checked. To illustrate this, consider an example where $D_{new}$ contains components $c_1$ and $c_2$ and $D_k$ contains the components $c_2$ and $c_3$. Since $D_{new}$ and D are both in MNF, $D_{new}$ and $D_k$ will have the form $$D_{new} = c_1 \in M_1^n \wedge c_2 \in M_2^n \tag{6a}$$

$$D_k = c_2 \in M_2^D \wedge c_3 \in M_3^D \tag{6b}$$

Without changing their meanings, these expressions can be expanded so that they contain the same set of components:

$$D'_{new} = c_1 \epsilon M_1^n \wedge c_2 \epsilon M_2^n \wedge c_3 \epsilon R_{c3} \quad (7)$$

$$D'_k = c_1 \epsilon R_{c1} \wedge c_2 \epsilon M_2^D \wedge c_3 \epsilon M_3^D \quad (8)$$

Now we see that the condition $D_{new}|=D_k$ holds if and only if $M_1^n \subset R_{c1}$, $M_2^n \subset M_2^D$ and $R_{c3} \subset M_3^D$. The first of these three conditions is always fulfilled and the third can never be fulfilled since, by definition of MNF, $M_3^D \subset R_{c3}$. Thus, this example shows that $D_{new}|=D_k$ holds if and only if (1) $D_k$ contains only components that are also contained in $D_{new}$, and (2) for all components $c_i$ contained in both $D_{new}$ and $D_k$ it holds that $M_i^n \subset M_i^D$.

---

For the algorithm, let |D| denote the number of conjunctions in D.
Algorithm (Conjunction (D, E)).
Input: D and E, both in MNF
Output: Q
Q := ⊥
for i = 1 to |D|
    for j = 1 to |E|
        Let $Q_{new}$ be a conjunction in MNF such
        that $Q_{new} \cong D_i \wedge E_j$
        for k = 1 to |Q|
            if $Q_{new} |= Q_k$ then go to LABEL1
        next
        for k = i + 1 to |D|
            if $_{new} |= D_k$ then go to LABEL1
        next
        for n = j + 1 to |E|
            if $Q_{new} |= E_n$ then go to LABEL1
        next
        if Q = ⊥ then Q := $Q_{new}$
        else Q := Q $\vee$ $Q_{new}$
        LABEL1
    next
next

---

To illustrate the algorithm, consider the following example.

$$D = H_1^1 = a \epsilon \{F\} \vee c \epsilon \{F\} \quad (1a)$$

$$E = H_2^1 = a \epsilon \{F\} \vee c \epsilon \{F\} \quad (1b)$$

Using this input the algorithm will during its run form four different terms $Q_{new}$. First $Q_{new} = a\epsilon\{F\} \wedge b\epsilon\{F\}$, which does not fulfill any of the three if-conditions, and thus $Q := a\epsilon\{F\} \wedge b\epsilon\{F\}$. Then $Q_{new} = a\epsilon\{F\} \wedge c\epsilon\{F\}$, but now it holds that $Q_{new}|=D_2=c\epsilon\{F\}$, and thus, $Q_{new}$ is not added to Q. Thirdly, $Q_{new} = c\epsilon\{F\} \wedge b\epsilon\{F\}$ and now it holds that $Q_{new}|=E_2=c\epsilon\{F\}$, and thus, $Q_{new}$ is not added to Q. Finally the fourth term is added resulting in $$Q = a\epsilon\{F\} \wedge b\epsilon\{F\} \vee c\epsilon\{F\} \quad (2)$$

As seen Q is in MNF and it is easily verified that $Q \cong D \wedge E$. This holds also in the general case according to the following Theorems 1 and 2 below.

Lemma 1 If the conjunction $D_{km} \wedge E_{nm}$ is not contained in Q after running the algorithm* (see below), then there is a conjunction $D_{km+1} \wedge E_{nm+1}$, where $k_m < k_{m+1} \leq |D|$ and $n_{m+1} = n_m$, or $k_{m+1} = k_m$ and $n_m < n_{m+1} \leq |E|$, such that $D_{km} \wedge E_{nm}| = D_{km+1} \wedge E_{nm+1}$.

PROOF. The fact that $D_{km} \wedge E_{nm}$ is not added to Q means that it must either hold that $D_{km} \wedge E_{nm}|=D_k$ for some $k > k_m$, or that $D_{km} \wedge E_{nm}|=E_n$ for some $n > n_m$. The first case implies that $D_{km} \wedge E_{nm}|=D_k \wedge E_{nm}$ for some $k > k_m$. The second case implies that $D_{km} \wedge E_{nm}|=E_n \wedge E_{nm}$ for some $n > n_m$. The numbers k and n are also limited from above by |D| and |E|, respectively. Thus we know that $D_{km} \wedge E_{nm}|=D_{km+1} \wedge E_{nm+1}$, where $k_m < k_{m+1} \leq |D|$ and $n_{m+1} = n_m$, or $k_{m+1} = k_m$ and $n_m < n_{m+1} \leq |E|$.

Theorem 1 It holds that $Q \cong D \wedge E$.

PROOF. First, we prove that $Q|=D \wedge E$. For each conjunction $Q_l$ in Q it holds that there is a conjunction $D_i$ in D and conjunction $E_j$ in E such that $Q_l \cong D_i \wedge E_j$. Since $D \wedge E \cong \vee_{i,j} (D_i \wedge E_j)$ this means that $Q_k|=D \wedge E$. It then follows that $Q|=D \wedge E$.

Left to prove is that $D \wedge E|=Q$. This holds, if for each conjunction $D_i$ in D and conjunction $E_j$ in E, there is a conjunction $Q_l$ in Q such that $$D_i \wedge E_j | = Q_l \quad (3)$$

Now, consider a modified version of the proposed algorithm, where the for-loop and the if-condition testing $Q_{new}|=Q_k$ are removed. Let us call this Algorithm*. If, after running Algorithm*, a conjunction $D_i \wedge E_j$ has not been added, we make use of Lemma 1 with $k_m = i$ and $n_m = j$. Lemma 1 then says that there is another conjunction $D_{km+1} \wedge E_{nm+1}$, where $k_m < k_{m+1} \leq |D|$ and $n_{m+1} = n_m$, or $k_{m+1} = k_m$ and $n_m < n_{m+1} \leq |E|$, such that $D_{km} \wedge E_{nm}|=D_{km+1} \wedge E_{nm+1}$. If this conjunction $Q'_{new}$ is included in the output, it becomes our $Q_l$ and condition (3) is fulfilled. If $Q'_{new}$ is not included in the output, we can again apply Lemma 1 which gives us a new $Q''_{new}$. Assume that we repeatedly use Lemma 1 in this way and never find a conjunction $D_{km+1} \wedge E_{nm+1}$ that is actually included in Q. Note then that every time we make use of Lemma 1, the index pair $<k_m, n_m>$ increases, i.e. either $k_{m+1} > k_m$ or $n_{m+1} > n_m$. Since the indices $k_m$ and $n_m$ can not grow beyond |D| and |E| respectively, this gives a contradiction. This means that there must finally be a conjunction $D_{km+1} \wedge E_{nm+1}$ that is included in the output Q. This conjunction becomes our $Q_l$, and the condition (3) is fulfilled.

Now, add the removed for-loop and if-condition testing $Q_{new}|=Q_k$ to Algorithm* obtaining the proposed algorithm. Note that the only change will be that if there already is a conjunction $Q_k$ in the output Q such that $Q_{new}|=Q_k$, $Q_{new}$ will not be added. But clearly, since $Q_{new}|=Q_k$, the condition (3) is trivially fulfilled. Hence, $Q_{new}$ does not need to be added to fulfill $D \wedge E|=Q$.

Theorem 2 The formula Q will be in MNF.

PROOF. Firstly, by construction of each $Q_{new}$, and then also Q, it holds trivially that Q is in MNF. Now, we prove that no conjunction $Q_1$ in Q implies another conjunction $Q_2$ in Q. For this, assume that after running the complete algorithm, it holds that $Q_k \cong D_{i2} \wedge E_{j2}$ is part of Q. Then, we have to show that if $D_{i1} \wedge E_{j1}|=D_{i2} \wedge E_{j2}$, $Q_{new} \cong D_{i1} \wedge E_{j1}$ has not been added to Q.

The proof will be organized in three cases. Consider first the case i1 > i2. Because of the first condition, $Q_{new} \cong D_{i1} \wedge E_{j1}$ will trivially not be added to Q since $Q_k \cong D_{i2} \wedge E_{j2}$ has already been added. The second case is when i1 < i2. Note that $Q_{new} \cong D_{i1} \wedge E_{j1}|=D_{i2} \wedge E_{j2}|=D_{i2}$. Since $Q_{new}$ will be compared to $D_{i2}$ in the second condition, $Q_{new} \cong D_{i1} \wedge E_{j1}$ will not be added. The third case is when i1 = i2, and we can investigate $D_{i1} \wedge E_{j1}|=D_{i1} \wedge E_{j2}$. If j1 > j2, $Q_k \cong D_{i1} \wedge E_{j2}$ has already been added to Q and $Q_{new} \cong D_{i1} \wedge E_{j1}$ will, because of the first condition, not be added. For the case j1 < j2, note that $D_{i1} \wedge E_{j1}|=E_{j2}$, and the third condition will therefore prevent $Q_{new} \cong D_{i1} \wedge E_{j1}$ from being added.

We now refer to FIG. 1, which shows a block diagram over diagnosis engine 100 for estimating a status of an entity 150 according to one embodiment of the invention. The entity 150, e.g. represented by a motor vehicle or any other complex system/device, has a plurality of components $c_1, \ldots, c_i, \ldots, c_n$, which each is assumed to be in a fault-free mode, NF, or be in exactly one of at least one fault mode, say the above-mentioned G, B, OC, SC, UF, or F.

The diagnosis engine 100 includes a processing unit 110 and storage areas 120, 130 and 140. The processing unit 110 is adapted to receive listings of diagnostic expressions D and E that indicate at least one of said modes for at east one of said components $c_1, \ldots, c_n$.

Specifically, the processing unit 110 is adapted to receive a first listing D of diagnostic expressions $<D_1, D_2, \ldots, D_k, \ldots, D_n>$ and store the first listing D in a first storage area 120 of said storage areas. The processing unit 110 is also adapted to receive a second listing E of diagnostic expressions $<E_1, E_2, \ldots, E_k, \ldots, E_n>$ and store the second listing E in the first storage area 120. One or both of the first and second listings D and E may have its origin in at least one sensor unit being associated with at the at least one component $c_1, \ldots, c_n$. Thus, at least one listing D and/or E may reflect test results in respect of at least one of the components $c_1, \ldots, c_n$ to which the at least one sensor unit is associated.

As a complement, or as an alternative to the test results, at least one of the listings D and E may be received from at least one auxiliary diagnosis engine being associated with at least a sub-group of said components $c_1, \ldots, c_n$. Consequently, another diagnosis engine may already have processed a portion of the test result source data before this information reaches the diagnosis engine 100 in the form of at least one status report. Such a report relating to said sub-group of components $c_1, \ldots, c_n$ to which the at least one auxiliary diagnosis engine is associated can then be incorporated into a status report R[Q] produced by the proposed diagnosis engine 100. The status report R[Q] can then be studied by a service technician, an operator of the entity 150, or other personnel being involved in the operation and/or maintenance of the entity 150.

For example, the status report R[Q] may be generated as follows. Suppose that there is a probability associated with each mode of each component, say P(pressure_sensor=NF)= 0.999, P(pressure_sensor=B)=0.0006, (pressure_sensor= UF)=0.0004. Let us further assume that the components may malfunction independently of one another. Then, the probability for one mode becomes equal to the product of the individual modes. For instance, for a system having two pressure sensors, we would have P(pressure_sensor_1=NF & pressure_sensor_1=B)=0.999×0.0006. The final diagnostic expression Q (e.g. Q=Q1∨ Q2∨ Q3) obtained after having processed all test results is studied. Here, the most probable diagnoses are stored, which match Q1. Then, if there is another diagnosis matching Q2, which is even more probable, this diagnosis may be stored instead of Q1, and so on. In a system having three pressure sensors we may have the final diagnostic expression Q=Q1∨ Q2=P1 ⊂ {NF, B} & P2 ⊂ {UF}∨ P2 ⊂ {UF} & P3 ⊂ {B, UF}. The most probable diagnosis matching Q1 is <NF, UF, NF>, whereas the most probable diagnosis matching Q2 is <NF, NF, B>, which is somewhat more probable than <NF, UF, NF>. Therefore, <NF, NF, B> is stored and <NF, UF, NF> is discarded. Consequently, the status report may be R[Q]={<NF, NF, B>}.

A second storage area 130 of said storage areas is adapted to store a listing of enhanced diagnostic expressions Q indicating at least one of said modes for at least one of said components $c_1, \ldots, c_n$. Before producing the status report R[Q] being derived from the first and second listings D and E respectively, the processing unit 110 is adapted to create an empty listing of enhanced diagnostic expressions Q by clearing any contents of the second storage area 130. Provided an assumption that the modes of the components $c_1, \ldots, c_n$ are probabilistically independent, and a set of a-priori probabilities for that each component attains a particular mode, the status report R[Q] can be produced based on the listing of enhanced diagnostic expressions Q as follows. First, a probability is calculated for each conjunction in the listing of enhanced diagnostic expressions Q. Then, the most probable diagnoses, or a group of diagnoses whose respective probability exceed a threshold value, is selected as a basis for the status report R[Q].

Thereafter, for each combination of diagnostic expressions $D_i$, $E_j$ in the listings D and E, the processing unit 110 is adapted to generate a current joint diagnostic expression $Q_{new}$ representing a conjunction of a first diagnostic expression $D_i$ from the first listing D and a second diagnostic expression $E_j$ from the second listing E. Further, the processing unit 110 is adapted to compare the current joint diagnostic expression $Q_{new}$ with each diagnostic expression in the listing of enhanced diagnostic expressions Q stored in the second storage area 130. Of course, an initial comparison here becomes trivial, since at this stage the second storage area 130 is empty.

Nevertheless, the current joint diagnostic expression $Q_{new}$ is discarded, if there exists a previous expression $Q_k$ in the listing of enhanced diagnostic expressions Q, and the current joint diagnostic expression $Q_{new}$ implies the previous expression $Q_k$. The current joint diagnostic expression $Q_{new}$ is likewise discarded if there exists a first diagnostic expression $D_k$ in the first listing D, where the first diagnostic expression $D_k$ has not yet been included in a joint diagnostic expression and the current joint diagnostic expression $Q_{new}$ implies the first diagnostic expression $D_k$. Analogously, the current joint diagnostic expression $Q_{new}$ is discarded if there exists a second diagnostic expression $E_k$ in the second listing E, where the second diagnostic expression $E_k$ has not yet been included in a joint diagnostic expression and the current joint diagnostic expression $Q_{new}$ implies the second diagnostic expression $E_k$. The processing unit 110 is adapted to store any other joint diagnostic expression $Q_{new}$ in the second storage area 130 as an addition to the listing of enhanced diagnostic expressions Q. I.e. the second storage area 130 exclusively contains diagnostic expressions $Q_k$ that fulfill the above requirements.

When all combinations of diagnostic expressions $D_i$, $E_j$ in the listings D and E have been tested this way, the processing unit 110 is adapted to generate the status report R[Q] based on the listing of enhanced diagnostic expressions Q stored in the second storage area 130.

Preferably, the diagnosis engine 100 includes, or is associated with, a computer readable medium 140 storing a program adapted to make the processing unit 110 control the above-described procedure.

Naturally, in an implementation of the above-described diagnosis engine 100, two or more of the storage areas 120, 130 and 140 respectively may be represented by different partitions of the same memory module/computer readable medium.

Figure 2:
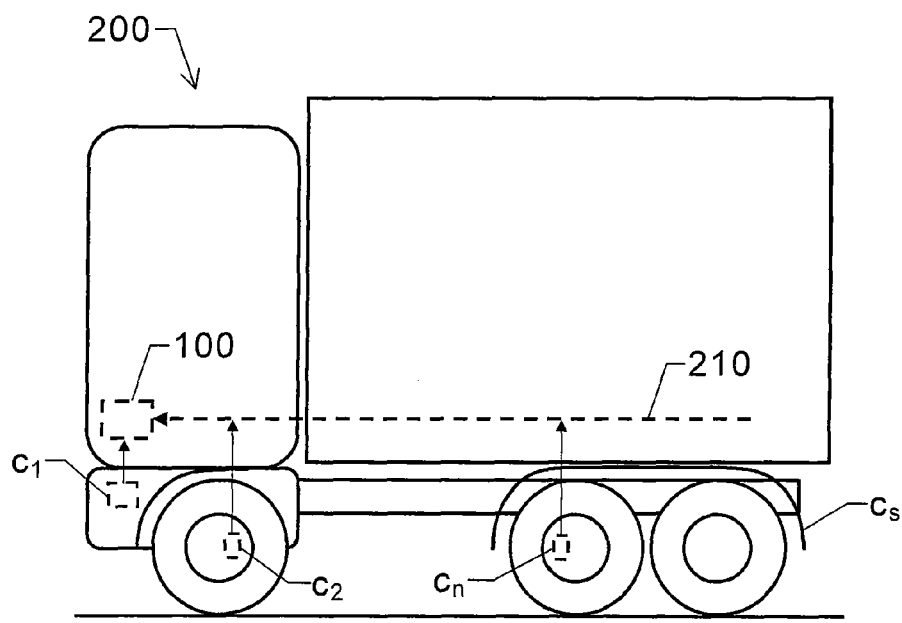

FIG. 2 schematically depicts a motor vehicle 200 being equipped with the proposed diagnosis engine 100. Specifically, the vehicle 200 includes a number of components $c_1, c_2, \ldots, c_n, \ldots, c_s$ and a diagnosis system, which is adapted to estimate a status of at least a sub-group of its components, say $c_1, \ldots, c_n$. The diagnosis engine 100, in turn, is included in the diagnosis system. Preferably, the diagnosis engine 100 is implemented in an ECU (electronic control unit) and test results in respect of one or more of the components in said sub-group $c_1, \ldots, c_n$ may be delivered to the diagnosis engine 100 via a data bus 210, e.g. adapted to the CAN format (CAN=Controller Area Network). However, the data bus 210 may equally well be adapted to any other standard, such as Time Triggered CAN (TTCAN), FlexRay, Media Oriented System Transport (MOST) or ByteFlight. These standards all represent efficient means of accomplishing networks in trucks, busses and other motor vehicles. By interconnecting various control units of a vehicle via a network, a very large number of vehicle functions may be accomplished based on relatively few ECUs. Namely, by combining resources from two or more ECUs a flexible and cost efficient over-all vehicular design is obtained.

The test results may equally well be generated in an ECU being common to an ECU in which the proposed diagnosis engine is implemented. Naturally, in such a case, the test results do not need to be sent via an external data bus.

Figure 3:
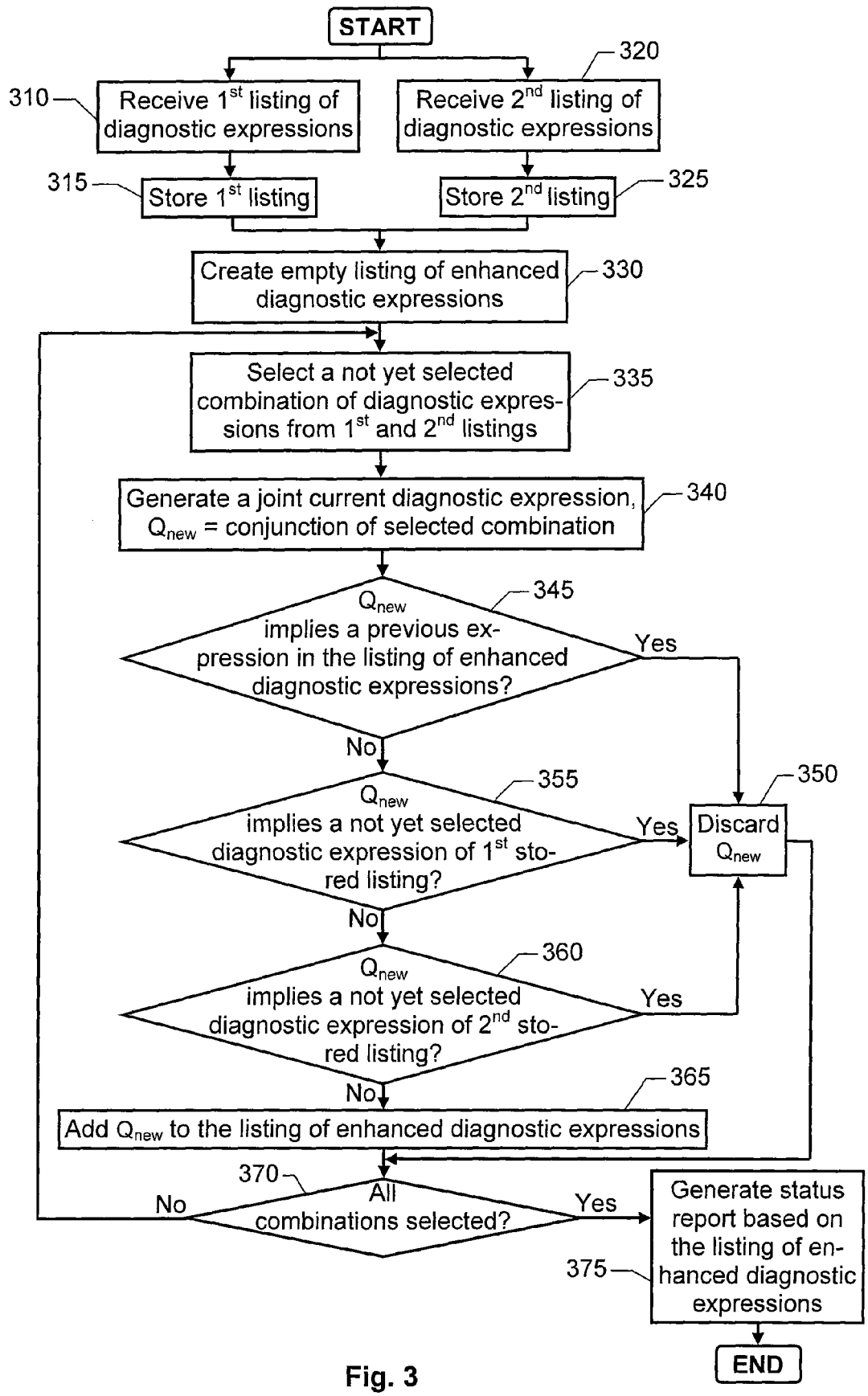
FIG. 3 shows a flow diagram illustrating the general method according to the invention.

In order to sum up, the general method of diagnosing an entity including a plurality of components according to the invention will be described below with reference to the flow diagram in FIG. 3.

A first step 310 receives a first listing of diagnostic expressions constituting a first part of a set of diagnostic expressions upon which a status report in respect of the entity is to be based. A step 315 then stores the first listing.

A step 320 receives a second listing of diagnostic expressions constituting a second part of the set of diagnostic expressions upon which the status report is to be based. Thereafter, a step 325 stores the second listing. The steps 320 and 325 may be parallel to, subsequent to or proceed the steps 310 and 315.

After completion of the steps 315 and 325, a step 330 follows, which creates an empty listing of enhanced diagnostic expressions, for example by clearing any contents of a predefined storage area. Subsequently, a sequence of steps 335 to 370 follows, which tests each combination of diagnostic expressions in the first and second listings with respect to three criteria. Specifically, a step 335 selects a not yet selected combination of diagnostic expressions from the first and second listings. Then, a step 340 generates a joint diagnostic expression, $Q_{new}$, as a conjunction of the first diagnostic expression from the first listing and a second diagnostic expression from the second listing selected in the step 335.

A following step 345 compares the joint diagnostic expression, $Q_{new}$, with each diagnostic expression in the listing of enhanced diagnostic expressions. If a previous expression is found in the listing of enhanced diagnostic expressions, and the currently tested joint diagnostic expression, $Q_{new}$, implies the previous expression, a step 350 follows. Otherwise, the procedure continues to a step 355. This step checks whether or not a first diagnostic expression exists in the first listing, where the first diagnostic expression has not yet been included in a joint diagnostic expression and the currently tested joint diagnostic expression, $Q_{new}$, implies the first diagnostic expression. If so, the step 350 follows. Otherwise, the procedure continues to a step 360. This step checks whether or not a second diagnostic expression exists in the second listing, where the second diagnostic expression has not yet been included in a joint diagnostic expression and the currently tested joint diagnostic expression, $Q_{new}$, implies the second diagnostic expression. If so, the step 350 follows. Otherwise, the procedure continues to a step 365.

The step 350 discards the currently tested joint diagnostic expression $Q_{new}$. Thereafter, the step 365 follows, which stores the joint diagnostic expression, $Q_{new}$, as an addition to the listing of enhanced diagnostic expressions, for example by updating the above-mentioned predefined storage area.

Subsequently, a step 370 checks whether or not all combinations of diagnostic expressions in the first and second listings have been tested. If so, the procedure continues to a step 375. Otherwise, the procedure loops back to the step 335 for selection of a yet untested combination. Finally, the step 375 generates a status report based on the listing of enhanced diagnostic expressions. Of course, after the step 375, the procedure may be repeated at any time in response to receiving one or more updated/new first and/or second listings of diagnostic expressions.

All of the process steps, as well as any sub-sequence of steps, described with reference to the FIG. 3 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code; object code, a code intermediate source and object code such as in partially compiled form, or in any other form suitable for use in the implementation of the process according to the invention. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The invention is not restricted to the described embodiments in the figures, but may be varied freely within the scope of the claims.

The invention claimed is:

1. A diagnosis engine (100) configured for estimating a status of an entity (150, 200) with a plurality of components $(c_1, \ldots, c_n)$ wherein at least one of the components is assumed to be in either a fault-free mode or be in exactly one of at least two fault modes, the diagnosis engine (100) comprising a processing unit (110) configured to receive first (D) and second (E) listings of respective diagnostic expressions $(D_1, \ldots, D_n)$ and $(E_1, \ldots, E_m)$ indicating at least one of said modes for at least one of said components $(c_1, \ldots, c_n)$, and generate a status report (R) based on said first (D) and second (E) listings of respective diagnostic expressions $(D_1, \ldots, D_n)$ and $(E_1, \ldots, E_m)$, wherein the diagnosis engine (100) comprises:

a first storage area (120) configured to store said first listing (D) of diagnostic expressions $(D_1, \ldots, D_n)$ constituting a first part of said diagnostic expressions, and store said second listing (E) of diagnostic expressions $(E_1, \ldots, E_m)$ constituting a second part of said diagnostic expressions; and a second storage area (130) configured to store a listing of enhanced diagnostic expressions (Q) indicating at least one of said modes for at least one of said components $(c_1, \ldots, c_n)$, and the processing unit (110) is configured to:

receive said first listing (D) of diagnostic expressions $(D_1, \ldots, D_n)$;

receive said second listing (E) of diagnostic expressions $(E_1, \ldots, E_m)$;

store said first and second listings (D; E) in the first storage area (120);

create an empty listing of enhanced diagnostic expressions (Q) by clearing any contents of the second storage area (130), and thereafter, for each combination of diagnostic expressions ($D_i$, $E_j$) in said first and second listings (D; E);

generate a current joint diagnostic expression ($Q_{new}$) representing a conjunction of a first diagnostic expression ($D_i$) from said first listing (D) of diagnostic expressions ($D_1, \ldots, D_n$) and a second diagnostic expression ($E_j$) from said second listing (E) of diagnostic expressions ($E_1, \ldots, E_m$);

compare the current joint diagnostic expression ($Q_{new}$) with each diagnostic expression in the listing of enhanced diagnostic expressions (Q) stored in the second storage area (130);

discard the current joint diagnostic expression ($Q_{new}$), if there exists a previous expression ($Q_k$) in the listing of enhanced diagnostic expressions (Q), and the current joint diagnostic expression ($Q_{new}$) implies the previous expression ($Q_k$);

discard the current joint diagnostic expression ($Q_{new}$), if there exists a first diagnostic expression ($D_k$) in said first listing (D) of diagnostic expressions ($D_1, \ldots, D_n$), the first diagnostic expression ($D_k$) having not yet been included in a joint diagnostic expression and the current joint diagnostic expression ($Q_{new}$) implies the first diagnostic expression ($D_k$);

discard the current joint diagnostic expression ($Q_{new}$), if there exists a second diagnostic expression ($E_k$) in said second listing (E) of diagnostic expressions ($E_1, \ldots, E_m$), the second diagnostic expression ($E_k$) having not yet been included in a joint diagnostic expression and the current joint diagnostic expression ($Q_{new}$) implies the second diagnostic expression ($E_k$); otherwise store the joint diagnostic expression ($Q_{new}$) as an addition to the listing of enhanced diagnostic expressions (Q) in the second storage area (130); and generate a status report (R) based on the listing of enhanced diagnostic expressions (Q).

2. The diagnosis engine (100) according to claim 1, wherein the processing unit (110) is configured to receive at least one of said first and second listings (D; E) from at least one sensor unit being associated with at least one of said components ($c_1, \ldots, c_n$), said at least one listing (D; E) reflecting test results in respect of at least one of said components ($c_1, \ldots, c_n$) to which the at least one sensor unit is associated.

3. The diagnosis engine (100) according to claim 1, wherein the processing unit (110) is configured to receive at least one of said first and second listings (D; E) from at least one auxiliary diagnosis engine being associated with at least a sub-group of said components ($c_1, \ldots, c_n$), said at least one listing (D; E) including status reports in respect of the sub-group of said components ($c_1, \ldots, c_n$) to which the at least one auxiliary diagnosis engine is associated.

4. A computer implemented method of diagnosing an entity with a plurality of components ($c_1, \ldots, c_n$) wherein at least one of the components is assumed to be in either a fault-free mode or be in exactly one of at least two fault modes, the method comprising receiving first (D) and second (E) listings of respective diagnostic expressions ($D_1, \ldots, D_n$) and $E_1, \ldots, E_m$) indicating at least one of said modes for at least one of said components ($c_1, \ldots, c_n$), and generating a status report (R) based on said first (D) and second (E) listings of respective diagnostic expressions ($D_1, \ldots, D_n$) and ($E_1, \ldots, E_m$), wherein said method comprises:

receiving said first listing (D) of diagnostic expressions ($D_1, \ldots, D_n$) constituting a first part of said diagnostic expressions;

receiving said second listing (E) of diagnostic expressions ($E_1, \ldots, E_m$) constituting a second part of said diagnostic expressions;

storing said first and second listings (D, E) in a first storage area (120);

creating an empty listing of enhanced diagnostic expressions (Q) by clearing any contents of a second storage area (130), and thereafter, for each combination of diagnostic expressions ($D_i$, $E_j$) in said first and second listings (D, E); using a computer processing device to:

generating a current joint diagnostic expression ($Q_{new}$) as a conjunction of a first diagnostic expression ($D_i$) from said first listing (D) of diagnostic expressions ($D_1, \ldots, D_n$) and a second diagnostic expression ($E_j$) from said second listing (E) of diagnostic expressions ($E_1, \ldots, E_m$);

comparing the current joint diagnostic expression ($Q_{new}$) with each diagnostic expression in the listing of enhanced diagnostic expressions (Q) stored in the second storage area (130);

discarding the current joint diagnostic expression ($Q_{new}$), if there exists a previous expression ($Q_k$) in the listing of enhanced diagnostic expressions (Q), and the current joint diagnostic expression ($Q_{new}$) implies the previous expression ($Q_k$);

discarding the current joint diagnostic expression ($Q_{new}$), if there exists a first diagnostic expression ($D_k$) in said first listing (D) of diagnostic expressions ($D_1, \ldots, D_n$), the first diagnostic expression ($D_k$) having not yet been included in a joint diagnostic expression and the current joint diagnostic expression ($Q_{new}$) implies the first diagnostic expression ($D_k$);

discarding the current joint diagnostic expression ($Q_{new}$), if there exists a second diagnostic expression ($E_k$) said second listing (E) of diagnostic expressions ($E_1, \ldots, E_m$), the second diagnostic expression ($E_k$) having not yet been included in a joint diagnostic expression and the current joint diagnostic expression ($Q_{new}$) implies the second diagnostic expression ($E_k$); otherwise storing the joint diagnostic expression ($Q_{new}$) as an addition to the listing of enhanced diagnostic expressions (Q) in the second storage area (130); and generating a status report (R) based on the listing of enhanced diagnostic expressions (Q).

5. The computer implemented method according to claim 4, wherein at least one of the respective receiving first and second listing steps receives a respective said first or second listing (D; E) that reflects test results from at least one sensor unit associated with at least one of said components ($c_1, \ldots, c_n$).

6. The computer implemented method according to claim 4, wherein at least one of the respective receiving first and second listing steps receives a respective said first or second listing (D; E) that includes diagnostic expressions generated by at least one auxiliary diagnosis engine configured to generate status reports with respect to at least a sub-group of said components ($c_1, \ldots, c_n$).

7. A motor vehicle (200) comprising a plurality of components ($c_1, \ldots, C_n, \ldots, c_s$) and a diagnosis engine configured for estimating a respective status of at least a sub-group ($c_1, \ldots, c_n$) of said components wherein at least one of the components is assumed to be in either a fault-free mode or be in exactly one of at least two fault modes, the diagnosis engine (100) comprising a processing unit (110) configured to receive first (D) and second (E) listings of respective diagnostic expressions ($D_1, \ldots, D_n$) and ($E_1, \ldots, E_m$) indicating at least one of said modes for at least one of said components ($c_1, \ldots, c_n$), and generate a status report (R) based on said first (D) and second (E) listings of respective the diagnostic expressions ($D_1, \ldots, D_n$) and ($E_1, \ldots, E_m$), wherein the diagnosis engine (100) comprises:
- a first storage area (120) configured to store said a first listing (D) of diagnostic expressions ($D_1, \ldots, D_n$) constituting a first part of said diagnostic expressions, and store said second listing (E) of diagnostic expressions ($E_1, \ldots, E_m$) constituting a second part of said diagnostic expressions; and
- a second storage area (130) configured to store a listing of enhanced diagnostic expressions (Q) indicating at least one of said modes for at least one of said components ($c_1, \ldots, c_n$), and
- the processing unit (110) is configured to:
  - receive said first listing (D) of diagnostic expressions ($D_1, \ldots, D_n$);
  - receive said second listing (E) of diagnostic expressions ($E_1, \ldots, E_m$);
  - store said first and second listings (D; E) in the first storage area (120);
  - create an empty listing of enhanced diagnostic expressions (Q) by clearing any contents of the second storage area (130), and thereafter, for each combination of diagnostic expressions ($D_i, E_j$) in said first and second listings (D; E);
  - generate a current joint diagnostic expression ($Q_{new}$) representing a conjunction of a first diagnostic expression ($D_i$) from said first listing (D) of diagnostic expressions ($D_1, \ldots, D_n$) and a second diagnostic expression ($E_j$) from said second listing (E) of diagnostic expressions ($E_1, \ldots, E_m$);
  - compare the current joint diagnostic expression ($Q_{new}$) with each diagnostic expression in the listing of enhanced diagnostic expressions (Q) stored in the second storage area (130);
  - discard the current joint diagnostic expression ($Q_{new}$), if there exists a previous expression ($Q_k$) in the listing of enhanced diagnostic expressions (Q), and the current joint diagnostic expression ($Q_{new}$) implies the previous expression ($Q_k$);
  - discard the current joint diagnostic expression ($Q_{new}$), if there exists a first diagnostic expression ($D_k$) in said first listing (D) of diagnostic expressions ($D_1, \ldots, D_n$), the first diagnostic expression ($D_k$) having not yet been included in a joint diagnostic expression and the current joint diagnostic expression ($Q_{new}$) implies the first diagnostic expression ($D_k$);
  - discard the current joint diagnostic expression ($Q_{new}$), if there exists a second diagnostic expression ($E_k$) in said second listing (E) of diagnostic expressions ($E_1, \ldots, E_m$), the second diagnostic expression ($E_k$) having not yet been included in a joint diagnostic expression and the current joint diagnostic expression ($Q_{new}$) implies the second diagnostic expression ($E_k$); otherwise
  - store the joint diagnostic expression ($Q_{new}$) as an addition to the listing of enhanced diagnostic expressions (Q) in the second storage area (130); and
  - generate a status report (R) based on the listing of enhanced diagnostic expressions (Q).

8. The motor vehicle according to claim 7, wherein the processing unit (110) is configured to receive at least one of said first and second listings (D; E) from at least one sensor unit being associated with at least one of said components ($c_1, \ldots, c_n$), said at least one listing (D; E) reflecting test results in respect of at least one of said components ($c_1, \ldots, c_n$) to which the at least one sensor unit is associated.

9. The motor vehicle according to claim 7, wherein the processing unit (110) is configured to receive at least one of said first and second listings (D; E) from at least one auxiliary diagnosis engine being associated with at least a sub-group of said components ($c_1, \ldots, c_n$), said at least one listing (D; E) including status reports in respect of the sub-group of said components ($c_1, \ldots, c_n$) to which the at least one auxiliary diagnosis engine is associated.

10. A computer program product comprising a non-transitory computer readable medium, the non-transitory computer readable medium comprising computer-executable program code stored therein configured for diagnosing an entity with a plurality of components ($c_1, \ldots, c_n$) wherein at least one of the components is assumed to be in either a fault-free mode or be in exactly one of at least two fault modes, the computer program product receiving first (D) and second (E) listings of respective diagnostic expressions ($D_1, \ldots, D_n$) and ($E_1, \ldots, E_m$) indicating at least one of said modes for at least one of said components ($c_1, \ldots, c_n$), and generating a status report (R) based on said first (D) and second (E) listings of respective diagnostic expressions ($D_1, \ldots, D_n$) and ($E_1, \ldots, E_m$), the computer executable code comprising:
- a first executable portion configured for receiving said first listing (D) of diagnostic expressions ($D_1, \ldots, D_n$) constituting a first part of said diagnostic expressions;
- a second executable portion configured for receiving said second listing (E) of diagnostic expressions ($E_1, \ldots, E_m$) constituting a second part of said diagnostic expressions;
- a third executable portion configured for storing said first and second listings (D, E) in a first storage area (120);
- a fourth executable portion configured for creating an empty listing of enhanced diagnostic expressions (Q) by clearing any contents of a second storage area (130), and thereafter, for each combination of diagnostic expressions ($D_i, E_j$) in said first and second listings (D, E);
- a fifth executable portion configured for generating a current joint diagnostic expression ($Q_{new}$) as a conjunction of a first diagnostic expression ($D_i$) from said first listing (D) of diagnostic expressions ($D_1, \ldots, D_n$) and a second diagnostic expression ($E_j$) from said second listing (E) of diagnostic expressions ($E_1, \ldots, E_m$);
- a sixth executable portion configured for comparing the current joint diagnostic expression ($Q_{new}$) with each diagnostic expression in the listing of enhanced diagnostic expressions (Q) stored in the second storage area (130);
- a seventh executable portion configured for discarding the current joint diagnostic expression ($Q_{new}$), if there exists a previous expression ($Q_k$) in the listing of enhanced diagnostic expressions (Q), and the current joint diagnostic expression ($Q_{new}$) implies the previous expression ($Q_k$);
- an eighth executable portion configured for discarding the current joint diagnostic expression ($Q_{new}$), if there exists a first diagnostic expression ($D_k$) in said first listing (D) of diagnostic expressions ($D_1, \ldots, D_n$), the first diagnostic expression ($D_k$) having not yet been included in a joint diagnostic expression and the current joint diagnostic expression ($Q_{new}$) implies the first diagnostic expression ($D_k$);

a ninth executable portion configured for discarding the current joint diagnostic expression ($Q_{new}$), if there exists a second diagnostic expression ($E_k$) said second listing (E) of diagnostic expressions ($E_1, \ldots, E_m$), the second diagnostic expression ($E_k$) having not yet been included in a joint diagnostic expression and the current joint diagnostic expression ($Q_{new}$) implies the second diagnostic expression ($E_k$); otherwise a tenth executable portion configured for storing the joint diagnostic expression ($Q_{new}$) as an addition to the listing of enhanced diagnostic expressions (Q) in the second storage area (130); and an eleventh executable portion configured for generating a status report (R) based on the listing of enhanced diagnostic expressions (Q).

11. The computer program product according to claim 10, wherein at least one of the respective first and second executable portions receives a respective said first or second listing (D; E) that reflects test results from at least one sensor unit associated with at least one of said components ($c_1, \ldots, c_n$).

12. The computer program product according to claim 10, wherein at least one of the respective first and second executable portions receives a respective said first or second listing (D; E) that includes diagnostic expressions generated by at least one auxiliary diagnosis engine configured to generate status reports with respect to at least a sub-group of said components ($c_1, \ldots, c_n$).

* * * * *